(12) United States Patent  
Glückert et al.

(10) Patent No.: US 11,620,898 B2  
(45) Date of Patent: Apr. 4, 2023

(54) VISUAL-ACOUSTIC MONITORING SYSTEM FOR EVENT DETECTION, LOCALIZATION AND CLASSIFICATION

(71) Applicant: HEXAGON TECHNOLOGY CENTER GMBH, Heerbrugg (CH)

(72) Inventors: Jan Glückert, Lindau (DE); Carl-Thomas Schneider, Zug (CH); Bernd Reimann, Heerbrugg (CH); Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 33 days.

(21) Appl. No.: 17/199,026

(22) Filed: Mar. 11, 2021

(65) Prior Publication Data

US 2021/0289168 A1  Sep. 16, 2021

(30) Foreign Application Priority Data

Mar. 12, 2020 (EP) ..................................... 20162825

(51) Int. Cl.
*H04N 7/18* (2006.01)
*H04N 13/254* (2018.01)
(Continued)

(52) U.S. Cl.
CPC ....... *G08B 29/188* (2013.01); *G06F 18/2431* (2023.01); *G06V 20/52* (2022.01);
(Continued)

(58) Field of Classification Search
CPC .... H04N 5/23245; H04N 7/18; H04N 13/254; H04R 1/08; G06K 9/628; G06V 20/52;
(Continued)

(56) References Cited

U.S. PATENT DOCUMENTS 6,826,284 B1 11/2004 Benesty et al.
8,363,848 B2 1/2013 Huang et al.
(Continued)

FOREIGN PATENT DOCUMENTS

CN 208273019 U 12/2018
CN 110033787 A 7/2019
(Continued)

OTHER PUBLICATIONS

EP Search Report in Application No. 20 16 2825 dated Sep. 11, 2020.
(Continued)

*Primary Examiner* — Christopher S Kelley
*Assistant Examiner* — Asmamaw G Tarko
(74) *Attorney, Agent, or Firm* — Maschoff Brennan

(57) ABSTRACT

A monitoring system for locating and classifying an event in a monitoring area by a computation unit including a visual 3D capturing unit providing geometric 3D information and an acoustic capturing unit providing an acoustic information of the monitoring area. An event detector is configured with an acoustic channel and a visual channel to detect the event. The acoustic channel is configured to detect the event as a sound event in the acoustic information and to determine a localization of the sound. The visual channel is configured to detect the event as a visual event in the geometric 3D information and to derive a localization of the visual event. The event detector provides detected events with a region of interest for detected event, which is analyzed in order to assign the detected event a class within a plurality of event classes.

14 Claims, 6 Drawing Sheets

(51) Int. Cl.
  *G06K 9/62*       (2022.01)
  *G10L 25/51*      (2013.01)
  *H04N 5/232*      (2006.01)
  *H04R 1/08*       (2006.01)
  *G06V 20/52*      (2022.01)
  *G08B 29/18*      (2006.01)
  *G06F 18/2431*    (2023.01)
  *H04N 23/667*     (2023.01)

(52) U.S. Cl.
  CPC ............ *G10L 25/51* (2013.01); *H04N 7/18* (2013.01); *H04N 13/254* (2018.05); *H04N 23/667* (2023.01); *H04R 1/08* (2013.01)

(58) Field of Classification Search
  CPC ............ G10L 25/51; G08B 13/1672; G08B 13/19602; G08B 29/186; G08B 29/188
  USPC ............................................. 348/46
  See application file for complete search history.

(56) References Cited

U.S. PATENT DOCUMENTS

| | | | |
|---|---|---|---|
| 11,195,067 B2* | 12/2021 | Shrestha | G06F 16/9024 |
| 2003/0234347 A1 | 12/2003 | Akagi | |
| 2011/0135102 A1* | 6/2011 | Huang | H04N 7/142 |
| | | | 381/103 |
| 2012/0038456 A1 | 2/2012 | Pikkarainen et al. | |
| 2012/0274466 A1 | 11/2012 | Mezger | |
| 2017/0064262 A1* | 3/2017 | Mozer | G08B 13/19682 |
| 2017/0123038 A1 | 5/2017 | Griggs | |
| 2018/0158305 A1* | 6/2018 | Noland | G08B 13/1672 |
| 2019/0014289 A1 | 1/2019 | Renkis | |
| 2019/0043525 A1* | 2/2019 | Huang | G10L 25/21 |
| 2019/0349551 A1* | 11/2019 | Mughal | H04R 1/406 |
| 2020/0005040 A1* | 1/2020 | Ur | G06F 3/011 |
| 2020/0012883 A1* | 1/2020 | Kuo | G06K 9/6289 |
| 2020/0042285 A1* | 2/2020 | Choi | H04R 3/04 |
| 2020/0351452 A1* | 11/2020 | Jung | H04R 1/08 |
| 2020/0358908 A1* | 11/2020 | Scalisi | G08B 13/19617 |
| 2020/0387719 A1* | 12/2020 | Jung | G06T 7/20 |
| 2021/0022547 A1* | 1/2021 | Stork genannt Wersborg | G06K 9/00 |
| 2021/0183227 A1* | 6/2021 | Kovscek | G01F 1/666 |
| 2021/0289168 A1* | 9/2021 | Glückert | H04N 5/23245 |

FOREIGN PATENT DOCUMENTS

| | | |
|---|---|---|
| DE | 10 2007 060 303 A1 | 6/2009 |
| EP | 2386872 A1 | 11/2011 |
| EP | 3 591 633 A1 | 1/2020 |
| RU | 2529758 C1 | 9/2014 |
| WO | 2019/135750 A1 | 7/2019 |
| WO | 2020/031006 A1 | 2/2020 |
| WO | WO-2021123185 A1 * | 6/2021 ........... A61B 5/6889 |

OTHER PUBLICATIONS

Kronfeld et al., "Schlussbericht zum InnoProfile-Transfer Begleitprojekt localizeIT : Vorhabenbeizchnung localizeIT—Lokalisierung visueller Medien : Laufzeit des Borhabens: Aug. 1, 2014 bis Jul. 31, 2019, Berichtszeitraum: Aug. 1, 2014 bis Jul. 31, 2019" Jan. 1, 2020.

* cited by examiner

VISUAL-ACOUSTIC MONITORING SYSTEM FOR EVENT DETECTION, LOCALIZATION AND CLASSIFICATION

CROSS-REFERENCE TO RELATED APPLICATIONS

This application claims priority to European Patent Application No. 20162825.2, filed on Mar. 12, 2020. The foregoing patent application is herein incorporated by reference.

FIELD OF THE INVENTION

The invention relates to a monitoring system for locating and classifying an event in a monitoring area by a computation unit. More particularly, the present invention relates to a monitoring system for detecting events, irregularities, anomalies, incidents or the like using a device, method and computer program.

Further, the invention concerns the field of art of an automated monitoring of surveillance areas by a computation system, to detect events, irregularities, anomalies, incidents or the like which could e.g. result in a security or health issue, theft, burglary, shooting, terror attack, fire, flooding, etc. For example, a portion of a building or a facility, a room, a storehouse, a shop, an entrance, a train platform, a waiting room, an airport, a shop floor, or the like as monitoring area is monitored by an at least partially automated monitoring system with a computation system and multiple sensors.

BACKGROUND

Examples of known surveillance systems can e.g. be found in US 2019/349551, WO 2020/031006, U.S. Pat. No. 8,363,848, WO 2019/135750, CN 110033787, US 2019/014289, CN 208273019, U.S. Pat. No. 6,826,284. In particular systems configured for visual three-dimensional measurements of the monitoring area, like in US 2012/274466, EP 2386872, RU 2529758, DE 10 2007 060 303, US 2012/038456, US 2003/234347 are a serious advantage over simple prior art 2D camera surveillance solutions.

BRIEF DESCRIPTION OF THE INVENTION

It is therein an object of some aspects of the invention to provide a reliable and effective monitoring, which can automatically provide information of events which could be potential incidents. Thereby, e.g. security personnel needs not to be present all the time, human observations can be avoided and/or reduced, many areas can be consistently and simultaneously monitored and human interaction can be reduced to the automatically raised events only. In preferred embodiments, these systems operate continuously, 24 hours a day and 365 days a year, with low energy consumption. Therein, false alerts and erroneous detection of events should be avoided as well as a missing of an event.

It is also an object to not only reliably detect an event, but to provide the event together with information of its localization and the time it occurred in the monitoring area, preferably with an automated distinction and/or classifying of the event to one or more groups, types or classes of events. Also, corresponding relevant sensor information for the event can be provided for logging and/or further processing.

Another object can be to reduce a storage space required for recordings and logs, without having to continuously store all the data from the sensors for a long time. Such would not only be memory and bandwidth intense but could also raise privacy concerns or contradict with according laws of data protection and freedom of information.

A problem therein is to provide a system that automatically derives events or candidates of likely events which are detected reliably and also pre-classified to actually be an event of potential relevance with a characterization of a class of the event.

Those objects are achieved by realizing the features of the independent claims. Features which further develop the invention in an alternative or advantageous manner are described in the dependent patent claims.

For example, an embodiment of a monitoring system according to some aspects of the present invention comprises at least a visual 3D capturing unit configured for an optical 3D acquisition of the monitoring area, e.g. in form of a point cloud of the monitoring area or thereof derived 3D data like a digital 3D model of the monitoring area. A visual 3D capturing unit with an electro-optical distance meter, e.g. in form of a laser scanner can be a preferred embodiment, but also a rim camera, a structured light sensor or a stereo-camera can be examples. An acquisition range of the visual 3D capturing unit is therein a three-dimensional volume (and not only a flat plain slice or disk), preferably substantially a half-dome or at least about a quarter of a sphere. The visual 3D capturing unit can optionally be configured to additionally capture 2D images of the monitoring area in a visual and/or invisible (like infrared or ultraviolet) spectral range, e.g. by at least one two-dimensional camera.

The embodiment of a monitoring system according to the present invention also comprises an acoustic capturing unit with a microphone array, which has a known configuration of multiple acoustic-electric transducers, e.g. with three or more microphones arranged in a known distance and/or with a known directivity with respect to one another and preferably also with respect to the visual 3D capturing unit.

The system therein preferably comprises the acoustic and visual 3D capturing unit in a single monitoring device, for example a substantially half-dome shaped surveillance device to be mounted at a ceiling, a wall, a tower, a pole, a cantilever or the like at the monitoring area. The system also comprises a computation unit, which can preferably at least partially be comprised in the monitoring device that is located at the monitoring area as a local processor, edge- or fog-computation system—and/or it can be located at least partially at a remote location from the monitoring area, such as a workstation-, server- or cloud-computation system.

The monitoring system comprises an event detector comprising at least two channels, a visual channel and an acoustic channel. According to the present invention, the visual 3D data or geometric 3D information captured by the system is provided to a visual event detector unit, which is configured to detect visual events in the 3D information, which can e.g. be determined according to change in the visual 3D information, in particular a change that fulfills one or more defined criteria to be detected as an event, such as an amount of change, a location boundary of change, etc., and/or by other visual 3D event detection algorithms. A detected event therein comprises a location information of where in the monitoring area the event is detected, and also when in time the event is detected, wherein the time can also be provided implicitly by a raising and providing of an event notification at the time of detection. The localization of the event can e.g. be derived as a location within the 3D data, at or about which the change is detected. In other words, an event together with a corresponding region of interest, which comprises a spatial region of the event in space and a temporal region in form of a time or time-interval of the event, is detected by the detector and provided as detected event, e.g. with an according notification in the computation system.

According to some aspects of the present invention, also the acoustic data or information captured by the system is provided to an acoustic event detector unit, which is configured to detect sound events in the acoustic data. The sound event can e.g. be determined according to change in sound intensity or loudness and/or according a specific signature in the acoustic information (e.g. one of a plurality of predefined signatures) and/or by one acoustic event detection algorithms such as cross-correlation, energy prediction, wavelet filtering as well as RNN- or LSTM-based algorithms. The acoustic event detector is therein configured to acoustically localize the sound event based on the acoustic information from the multiple microphones, e.g. according to a time-shift, phase-shift and/or intensity difference, which can comprise a deconvolution of the acoustic signal for localization or other enhanced algorithms for doing so. In other words, an event together with a corresponding region of interest, comprising a spatial region of the event in space and a temporal region in form of a time or time-interval of the event, is detected by the detector and provided as detected event, e.g. with an according notification in the computation system.

The event detector according to the invention is therein configured to detect one or more events, in one or more of the visual and/or acoustic channels, which events might occur simultaneously or only in one of the channels. Each detected event comprises information of an according region of interest in space and time. Those events are then provided to a classifier, which also has access to the visual 3D information and the acoustic audio information, and which is configured to analyze the regions of interest of the detected events to assign the detected events to classes within a plurality of event classes, which is done in both the acoustic audio information as well as in the visual 3D information for every detected event, for a visual event and/or a sound event.

The system according to some aspects of the invention also comprise an event classifier configured for a classification of those detected events according to the invention, which processes both of the visual and acoustic channel for the classification. The thereby resulting classification of the detected events tends to be more robust, as many ambiguities or false classifications can be avoided by the combined analyzing of the acoustic and visual 3D information that is directed to the respective regions of interest of detected events in space and time. Potential events can therein be classified in a matched analysis, providing a common classification of the sound events and/or the visual events for their regions of interest.

Therein, the combined classification according to the present invention can go beyond a simple matching of equal regions of interest. For example, a gunshot can be acoustically detected and classified in a first region of interest only, while the visual 3D channel does not detect or classify an event at this first region where the hidden gun was fired. But the visual 3D channel detects a bullet impact or a person sinking to ground in another second region of interest. The present invention can therein correctly classify the event that happened to have this correlation, which would not be given in a prior art monitoring system.

In a first embodiment, the classification can be applied individually for each channel—also on the one in which no event has been detected—within the region of interest in time and/or space. A separated, individually analyzing in an acoustic classifier specifically applied to the region of interest and individually analyzing in a visual 3D classifier specifically applied to the region of interest can then be followed by a merging of the classification results for the common classification of an event in a combined analysis of the events and their classification in acoustic and visual 3D. In an embodiment, a machine learned algorithm can discern or classify common events for this information and provide those for further processing, as notification, alert signal, etc.

In a second embodiment, the classification can be applied in a combined classifier which is configured to conjointly analyze the acoustic audio information and the visual 3D information in the region of interest in a single classifier, which results in the common classification.

In a third embodiment, the first and second embodiment from above can also be derived in parallel and combined to result in the common classification.

In other words, some aspects of the invention relate to a monitoring system for automatically locating and classifying an event in a monitoring area by a computation system, for example to identify an anomaly at a building or facility. Located at the monitoring area, the system comprises at least a visual 3D capturing unit and an acoustic capturing unit.

The visual 3D capturing unit is therein configured for capturing and providing a geometric 3D information of the monitoring area, for example a unit that is configured with a sensor unit to provide point cloud data of the monitoring area or a 3D model of the monitoring area, such as e.g. a laser scanner, rim camera, structured light sensor, etc.

The acoustic capturing unit is therein configured with a microphone array, which is configured for deriving and providing an acoustic information of the monitoring area, for example with a plurality of acoustic-electric transducers such as microphones in a known arrangement with respect to each other.

Preferably, the visual 3D capturing unit and the acoustic capturing unit are comprised in a single device to be mounted at the monitoring area, preferably with the microphones substantially surrounding the visual 3D capturing unit in a fixed, known arrangement.

According to some aspects of the invention, the computation system is configured to comprise an event detector configured with at least an acoustic channel and a visual channel to detect the event and to determine a localization of the event. The acoustic channel is provided with the acoustic information and configured to detect the event in form of a sound event in the acoustic information. The detecting of the sound event can for example comprise at least one of a detecting of an exceeding of a level threshold in the acoustic information, and/or a detecting of a characteristic signature in the acoustic information. In an embodiment, the threshold can therein also be dynamically adapting, e.g. to an environmental background noise, preferably automatically. The acoustic information can also be filtered to a desired spectral range, optionally also adaptive to environment noise, preferably automatically.

The acoustic channel of the detector is also configured to determine a localization of the sound event in the monitoring area based on the acoustic information from the multiple microphones of the microphone array, for example as known in the art based on a shift in time and/or phase of arrival in the acoustic information from the different microphones and/or of a difference in amplitude, wherein a deconvolution algorithm can be applied which can optionally also take into account at least a portion of a geometry of the monitoring area, e.g. derived from the 3D visual information.

The visual channel is provided with the geometric 3D information and configured to detect the event in form of a visual event in the geometric 3D information. For example, a detecting of a visual and/or geometrical change in the geometric 3D information over time can be provided as visual event. The visual channel of the detector is also configured to derive a localization of the visual event in the monitoring area based on the geometric 3D information, e.g. as a location or section within the monitoring area at which the change took place.

The event detector is therein configured to provide one or more detected events, which can either be one of a sound event or visual event on its own, or one or more of acoustic and visual events together. Such a detected event is therein provided together with a region of interest of the event within the monitoring area, which region of interest is comprising the localization—so to say as a spatial region, and also a time information—so to say as a temporal interval, of the detected event.

The system according to some aspects of the invention also comprise a classifier, which is provided with the geometric 3D information, the acoustic information and the detected event with its region of interest. This classifier is configured to analyze the region of interest by processing the acoustic and geometric 3D information within the region of interest in order to assign the detected event to a class within a plurality of event classes. The classifier can for example be or comprise a machine learned classification algorithm or neural network. The detected event with its assigned class and region of interest can then be provided as monitoring result, e.g. to a higher-level surveillance or security system.

In an embodiment, the classifier can be specifically configured to individually classify each, the acoustic information and also the visual information, on its own—each within the region of interest of the detected event, regardless whether the detected event is a sound event or a visual event. This is then followed by a combining of the resulting individual classification results, for example based on a matching of their event classes, optimally also based on a proximity of their respective localization and/or time. Therein, also a dependence and/or causality of different classes of events can be included in the combining, e.g. by a rule based and/or machine learned approach.

In another embodiment, alternatively or additionally, the classifier can be configured to conjointly classify the acoustic information and the visual information within the region of interest of the detected event in a multimodal classifier. For example, a sensor fusion classification of at least the geometric and acoustic information within the region of interest in time and/or space can be applied to derive a classification of the event.

In an embodiment, the system can be configured in such way that, upon the event being detected, the classifier is configured to analyze the acoustic information in the region of interest with an applying of a numerical acoustic beamforming towards the localization of the detected event. Also, the acoustic information can be analyzed by the classifier within a limited time-interval around the region of interest of the detected event. In an embodiment, the system can therein comprise a buffer-memory to temporarily store at least a portion of the acoustic information and/or visual 3D information. The buffer-memory is provided to the classifier to analyze a limited time-interval before a detected event. In an embodiment, the acoustic and/or visual 3D information can also be streamed to an external buffer-memory or longtime storage, e.g. a cloud storage, which is configured to be accessible for the classifier.

For example, the localization of the detected visual event can configure the acoustic capturing unit to derive the acoustic information from within a limited sub-region of the monitoring area at the region of interest by acoustic beamforming, or acoustic beamforming in direction of the region of interest is post-applied to the stored acoustic information, preferably within a time-interval at or about the region of interest of the detected event. In an embodiment, for example also a speech analysis can be applied to the acoustic information within the region of interest, in particular when the event is classified as a human speech.

In an embodiment, the region of interest can also be derived with a directional information from the localization of the sound event combined with a corresponding distance measurement in this direction of the sound event that is derived from the visual 3D information to form a three-dimensional information for the region of interest of the sound event. In particular, when the sound event is substantially contemporaneous with a visual event, their localizations can be compared and/or reconciled.

In an embodiment of the system, in particular when trimmed to reduce energy consumption and/or increase lifetime of the system, the visual 3D capturing unit can be provided with a standby mode and an alert mode. In such a standby mode, a rate of capturing the geometric 3D information is lower than in the alert mode, for example at least half of the rate, or 10% of the rate or even less. In particular, the rate of capturing can also be substantially zero in the standby mode.

In an embodiment, the acoustic channel—which generally tends to require less energy and/or does not suffer wear—can be configured such that the acoustic information is continuously provided to the event detector to continuously detect sound events. Upon a detection of the sound event, the visual 3D capturing unit is then set into the alert mode, optionally with an aligning of the capturing of the visual 3D capturing unit towards or with a focus on the region of interest, that has been detected in the acoustic channel.

In another embodiment, also the acoustic channel can be provided with a standby mode, e.g. with a reduced functionality in this standby acoustic mode, in which some of the audio channels can be deactivated or reduced in functionality (e.g. in sampling rate and/or signal processing, etc.). For example, in an embodiment there can be at least a single microphone activated, which can be powered and evaluated to trigger a switching into an alert acoustic mode in case a defined loudness threshold is reached. In this alert mode of the acoustic channel, the remaining of the microphones of the array are also powered and evaluated, and the acoustic localizing is activated, etc. and optionally also the visual channel is set to alert mode as discussed above.

The rate of capturing the geometric 3D information can therein e.g. be adapted in at least one of the following parameters:
  a point repetition rate of a laser scanner of the visual 3D capturing unit,
  a rotation speed of a laser measurement beam of a laser scanner of the visual 3D capturing unit, and/or
  a frame rate of a camera of the visual camera unit.

Upon the detected event being detected, the classifier can be configured to analyze visual information in a limited spatial bounding box within the monitoring area, which bounding box is derived according to the localization of the detected event, and also within a limited time-interval around the detected event, in accordance with the region of interest. For example, the localization of a detected sound event can configure the visual 3D capturing unit to capture visual 3D information within a limited sub-region of the monitoring area at the region of interest only, optionally with a wake-up of the visual capturing unit from the standby mode to the alert mode.

In an example, the visual 3D capturing unit can be configured with a laser range finder with a, preferably in two axes, pivotable measurement direction. The visual 3D capturing unit can therein be configured as a laser scanner with a scanning range that covers about a half-dome range or more, in which scanning range a point cloud of the monitoring area is derived. For example, a device with an optically transparent half-dome housing, surrounded by spatially substantially equally distributed microphones, and configured to be mounted at a wall or ceiling at a surveillance site can be an embodiment.

In an embodiment according to the invention, the acoustic localization of the sound event can be derived with an acoustic localization in at least a direction, preferably in three dimensions, by an evaluation of the acoustic information of the sound event. Such can e.g. comprise an evaluation of a time of arrival, phase delay, group delay and/or amplitude difference in the acoustic information from different microphones of the microphone array, preferably with a deconvolution algorithm applied to the acoustic signals, for example similar to US 2017/0123038 or others.

In an advanced embodiment, the localization of the sound event is derived with a correcting of an influence of at least part of a 3D geometry of the monitoring area to the acoustic information. Therein, the 3D geometry of the monitoring area, or at least part of it like the most dominantly large plain surfaces such as walls, floor or ceiling are according to this aspect of the invention derived from the geometric 3D information captured by the visual 3D capturing unit. Such can comprise a computing of a corrected spatial localization of the sound event comprising a reverberation and/or echo in the acoustic information from at least part of the 3D geometry, in particular an acoustic reflection, damping and/or resonance.

By way of example, the monitoring system is further configured to derive a 3D model of the environment from the geometric 3D information and the event detector comprises an acoustic localization algorithm configured to determine the localization of the event. With respect to at least two microphones of the microphone array, the acoustic localization algorithm is configured to identify for each of the two microphones a corresponding primary and secondary sound signal, e.g. wherein the primary sound signals are associated with a minimum of reflections between the origin of the sound event and the respective microphone and the secondary sound signals are associated with a reflection of the corresponding primary sound signal. In other words, the secondary sound signals are echoes of the corresponding primary sound signals, e.g. first order echoes.

The acoustic localization algorithm may then be configured to compare arrival times for each of the primary and secondary signals and to interpret the arrival times in light of the 3D model of the environment and, based thereof, to determine the localization of the sound event. For example, the actual knowledge of the surrounding geometry allows the acoustic localization algorithm to interpret differences in the times of arrival of the primary and secondary sound signals for resolving ambiguities in case only primary sound signals would be analyzed.

In a further embodiment, the acoustic localization algorithm is further configured to provide a so-called high-intensity localization mode, wherein the localization of the sound event is determined solely by using the secondary sound signals, e.g. in case the primary sound signals saturate the one of the two microphones, wherein arrival times of the secondary sound signals are interpreted in light of the 3D model of the environment. For example, very loud events may saturate the primary signal at the microphones impeding an interpretation of the audio signal. As the echo signal is lower, it may be the more promising candidate for interpreting the signal, wherein use of solely the secondary sound signals is made possible by the knowledge of the spatial geometry around the sensor.

In a further embodiment, the acoustic localization algorithm is further configured to determine shape parameters, e.g. signal widths, of the primary and secondary sound signals and to interpret the values of the shape parameters, e.g. the signal widths, in light of the 3D model of the environment and, based thereof, to determine the localization of the sound event.

In a further embodiment, the monitoring system is configured to assign different acoustical properties to different surfaces within the 3D model of the environment, e.g. different sound reflection properties due to the material or geometry of the corresponding surfaces. For example, the monitoring system comprises a camera for acquiring images of the environment and/or the monitoring system is configured to analyze laser data of a laser scanner of the visual 3D capturing unit, wherein the monitoring system is configured to analyze images of the camera and/or the laser data in order to differently classify the different surfaces. For example, this way the monitoring system is able to determine a surface roughness which allows to derive a damping ratio between incoming and reflected acoustic wave and/or a signal distortion of the reflected acoustic wave, e.g. as a function of an incident angle of the sound wave onto the respective surface. Thus, according to this embodiment, the acoustic localization algorithm is further configured to take into account the acoustical properties of the different surfaces for the interpretation of the arrival times, the signal widths, and/or signal shapes of the primary and/or secondary sound signals in order to determine the localization of the sound event.

In a further embodiment, the acoustic localization algorithm is further configured to determine a vertical height of the sound event with respect to a ground surface within the 3D model of the environment. For example, microphone arrays in a surveillance sensor are often attached to the ceiling. Therefore, acoustic localization is often sensitive to lateral positioning of sound events (as the microphones are essentially separated in lateral directions, e.g. the microphones being in a horizontal plane) but less sensitive to the vertical direction, which often suffers from ambiguities. However, ambiguities in the vertical direction can be resolved when the influence of the surrounding geometry is considered.

By way of example, the vertical position of a sound event can be crucial for interpreting a critical situation. For example, a lightly injured person may rather stand or sit while crying or shouting for help while a severely injured person may rather lay on the ground. By way of another example, the detection of a baby crying in public space should not automatically result in an alarm, as long as the localization of the sound signal indicates a vertical height position that is typical for a baby carriage, particularly in case other persons are close. In contrast, a baby crying detected on floor level without any other persons being detected very close-by may be an incidence that should trigger further actions.

Therefore, in a further embodiment, the classifier is configured to assign the class within the plurality of event classes to the detected event by taking into account the determined vertical height of the sound event with respect to a ground surface within the 3D model of the environment.

Thus, the monitoring system according to one of the embodiments disclosed herein is able, e.g. in a plug-and-play fashion, to record a point cloud of a scene and to run a fitting algorithm to interpret reflective surfaces in the point cloud, e.g. in order to automatically classify surfaces (floor, ceiling, surrounding walls) or objects (perforated acoustic blinds, plants) and assign corresponding acoustic properties. For example, a camera may record visual images providing for a prediction of the acoustical properties of surfaces and for object recognition. Audio data may be processed by taking into account geometric information derived from the point cloud, e.g. the audio processing involving fast Fourier transformation, deconvolution of audio signals, pairwise correlation functions, etc.

In an example of an embodiment, a point spread function is estimated from the 3D geometry, which is applied in a deconvolution algorithm that derives the localization of the sound event from the acoustic information.

In another embodiment, the acoustic information can also be provided to the classifier with a correcting of an influence of at least part of a 3D geometry of the monitoring area to acoustic signals, wherein the 3D geometry can preferably be derived from the geometric 3D information, e.g. to reduce reverberation or echo effects in the acoustic signal and thereby improve the classification.

A classifier according to the invention can e.g. be embodied with an at least semi-supervised deep learning algorithm, in particular as a neural network that is trained on a set of training data. At least part of the training data can therein also be artificially generated based on digital models, e.g. by computer rendering of visual 3D and/or acoustic information. Also, part of the training data can be provided, e.g. annotated or supervised on the fly during the monitoring by a human operator.

Some aspects of the invention also relate to an according building or facility surveillance device configured to detect an incident or anomaly at a surveillance-site and to provide a localization and classification of the incident or anomaly, which is configured as a device to be installed stationary at a surveillance-site to establish a system described herein.

Such a surveillance device comprises at least a visual 3D capturing unit comprising a laser range finder, configured to provide a geometric 3D data of at least a portion of the surveillance-site, an acoustic capturing unit with at least two acoustical-electrical transducers of a microphone array that is arranged in a known geometrical reference to the visual 3D capturing unit, and a computation unit configured to provide an event detector and a classifier and their interaction according to the invention as described herein.

The computation unit is preferably a local computational unit but can also comprise a data link or streaming link to an at least partially external or remote computation unit doing at least part of the computation and/or storage. The computation unit is therein provided and configured to comprise the event detector with a visual channel and an acoustic channel for detecting and localizing one or more events. The computation unit is therein further provided and configured to comprise the classifier which is configured to be activated upon an event from at least one of the channels of the event detector and applied specifically to a region of interest of the event on both the geometric 3D data and data from the acoustic capturing, to provide a classification of the event. The computation unit is also provided and configured to comprise an anomaly identification unit, configured to identify one or more of the detected and classified events to a type of anomaly and/or to a security alert, which security alert comprises the classification and region of interest of the detected event, preferably combined with an acoustic representation of the sound event and/or a visual representation of the visual event.

The visual 3D capturing unit can in particular be a 3D laser scanner with an at least half-dome scanning range, and the microphone array can have three or more spatially separated microphones with a defined distance and/or with a different orientation of their spatial directivity.

The acoustic capturing unit is therein configured to translate acoustic signals or sound waves into audio signals, which are digitized to according digital audio signals or acoustic information, in particular where those digital audio signals are time synchronized or comprise a time synchronization information for a synchronization in a range of at least nanoseconds, and provided as multi-channel acoustic information.

The device therein comprises an anomaly identification unit, configured to identify one or more of the detected and classified events to a type of incident, anomaly and/or to a security alert, which security alert comprises the classification and region of interest of the detected event, preferably combined with the acoustic information and the geometric 3D information of the region of interest of the detected event, as an acoustic and visual representation of the detected event.

Some aspects of the present invention also relate to an according monitoring method for detecting, locating and classifying an event in a monitoring area by a computation system, that can be done automatically, preferably without human interaction. This method comprises a generating of data providing a geometric 3D information of the monitoring area, e.g. by a visual 3D capturing unit, and a deriving of an acoustic information of the monitoring area, e.g. by an acoustic capturing unit with a microphone array. According to the invention, the method comprises a providing of the acoustic information to the acoustic channel of an event detector, for a detecting of a sound event in the acoustic information, and a determining of a localization of the sound event in the monitoring area based on the acoustic information by an acoustic localization algorithm. An embodiment of the detecting can e.g. comprise a detecting of an exceeding of a, preferably dynamically adapting, level threshold in the acoustic information and/or a detecting of a characteristic signature in the acoustic information.

According to some aspects of the invention, the method comprises a providing of the visual information to a visual channel of the event detector, for a detecting of a visual event in the geometric 3D information, and a deriving of a localization of the visual event in the monitoring area based on the geometric 3D information according to 3D coordinates of the visual event. An embodiment of the detecting can e.g. comprise a visual and/or geometrical change in the geometric 3D information.

Some aspects of the invention thereby comprise a detecting of a detected event and determining of the localization of the detected event in at least one of or both the acoustic and/or visual channel of the event detector, with a deriving of at least one region of interest for the detected event comprising the localization and a time information of the detected event. Based on this, the invention then comprises an analyzing of the region of interest within the monitoring area by a classifier, with analyzing of acoustic information and of geometric 3D information associated to the region of interest and an assigning of the detected event to a class within a plurality of event classes, wherein the assigning of the class is taking into account acoustic as well as visual classification features within the region of interest, in particular regardless whether the detected event was an sound event only, a visual event only or both.

An embodiment of the invention also relates to an according system providing the method, e.g. embodied as a computation unit. Such a device or system according to the present invention can comprise microcontrollers, microcomputers, DSPs or programmable and/or hardwired digital logics, etc., wherefore the present invention can involve or be embodied as a computer program product with program code being stored on a machine readable medium or embodied as an electromagnetic wave such as e.g. a wired or wireless data signal to be provided to the instrument, or a program stored at a remote (cloud-) computation unit linked to the instrument, which implements functionality according to the invention at least partially in software—which therefore is also an embodiment of the invention.

In particular, the invention therefore also relates to a computer program product with program code being configured for the execution of the method described herein, for those described aspects which are computed and/or calculated in a computation unit. Those aspects can e.g. be at least some of the steps of reading acoustic and visual 3D information in a digitized form, detecting sound events in this acoustic information and detecting visual events in the visual information, localizing the sound events based on the acoustic information and localizing the visual events in the visual 3D information, defining a region of interest for each of the detected events with a localization and a time of such events, and analyzing and assigning the detected events to a class in both of the visual information and the acoustic information and providing a combined acoustic-visual classification of the detected events, e.g. for alarming and/or further processing in particular, in a combination of the steps and/or when the program is carried out in the computation system of a monitoring system as described herein.

BRIEF DESCRIPTION OF THE DRAWINGS

Devices, methods, systems, setups and computer programs according to the invention are described or explained in more detail below, purely by way of example, with reference to working examples shown schematically in the drawing. Specifically.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are exemplary shown. The term "substantially" is used to express that a feature can, but in general is not required to be realized exactly up to 100%, but only in such a way that a similar or equal technical effect can be achieved. In particular, slight deviation, due to technology, manufacturing, constructional considerations, etc. can occur, while still within the meaning of the scope.

Figure 1:
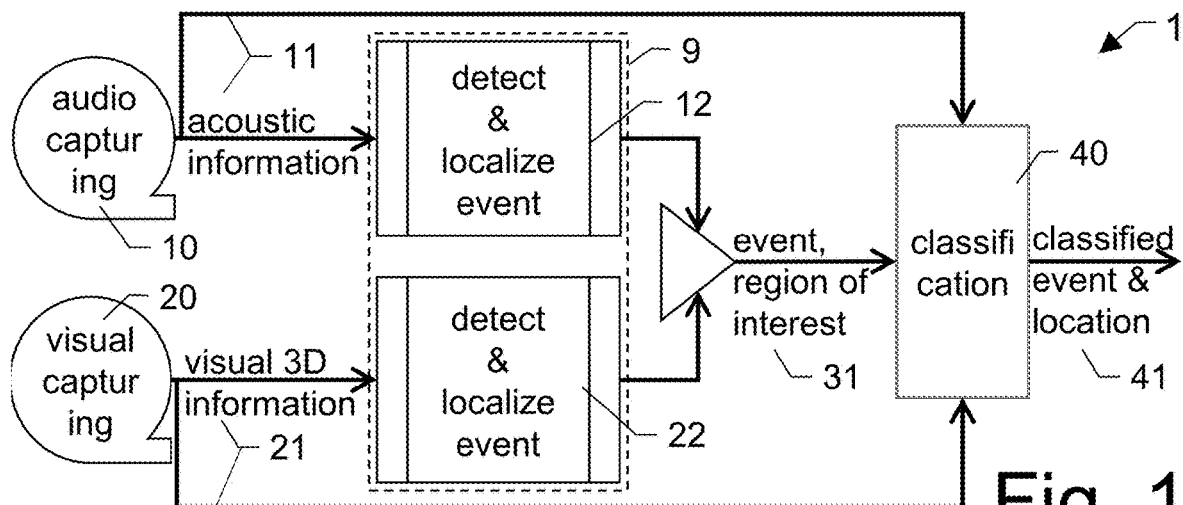
FIG. 1 shows an example of a first block diagram of an embodiment of the present invention.

FIG. 1 shows an example of an embodiment of a monitoring system 1 according to the invention in a block diagram. Therein, acoustic information 11 is captured by an according multi-channel acoustic capturing unit 10 with a microphone array of at least three, preferably more microphones, and then provided to the event detector, specifically to an acoustic channel of the event detector 12. Visual 3D information 21 is also captured by a visual capturing unit 20 and provided to the event detector, specifically to a visual channel of the event detector 22. When an event is detected by the event detector 12/22, it is also configured to derive a localization of the detected event within the monitoring area, based on the input information of the respective channel. The one or more detected event 31 is then provided together with a region of interest for this detected event, which comprises the localization and a time information of the detected event 31. Those detected events with their region of interest are then provided to a classifier 40 which is configured to derive a classification of the detected events from within a range of known classes, based on the acoustic information and visual information. The resulting classified event 41 with its region of interest is then provided for further proceeding, e.g. to derive incidents, security alarms, further computation, identification, storage, etc. In particular, the classifier 40 can be activated or instantiated by the detected events, while at least one channel 12/22 of the detector 9 is operating continuously.

Figure 2:
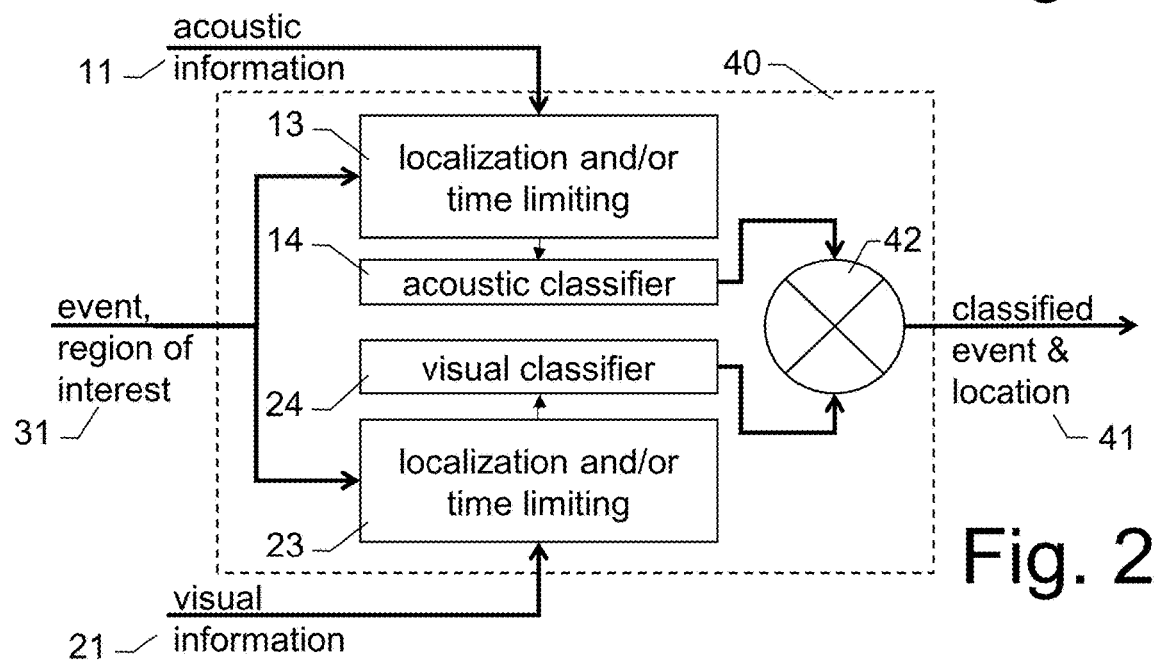
FIG. 2 shows an example of a sub block diagram of a first embodiment of the present invention.

FIG. 2 shows an illustration of an example of a first embodiment of a classifier 40 according to the present invention. Based in the region of interest of the detected event, the classifier 40 derives a limiting of a region in time and/or space within the acoustic information 11 respectively within the visual 3D information 21. For example, in the visual 3D information 21, a kind of bounding box at or in a defined range around the region of interest of the detected event can be defined, in which the visual 3D classifier 24 is applied to classify the content of this bounding box to one or more classes. The therein analyzed visual 3D information 21 can also be limited in time. It can in particular be limited to a time or time-interval at or around the time when the event was detected, which can e.g. also comprise an—at least short time—buffering of the visual 3D information to analyze pre- and post-event information and to classify a change in the visual 3D information due to the change. For example, classes of a group of objects, like human, animal, dog, cat, suitcase, car, parcel, chair, gun, knife, or so forth, can be assigned in the visual 3D data of the region of interest, or also classes like toolbox, forklift, storage basket, or so forth.

In the acoustic information 11, for example a time or time-interval at or around the time information of the detected event can be classified by the acoustic classifier 14 to one or more defined classes of events, e.g. like, speech, scream, bark, ringtone, knock, motor, glass break, explosion, shot, and/or the like. Dependent on the assigned class, also a further identification of the acoustic information can be applied, e.g. a literal content of a speech by speech recognition, a discrimination of scream into joy or pain, etc. By the microphone array according to the invention, the acoustic information can optionally also be extracted for a specific defined location at the region of interest, by an acoustic beam shaping algorithm applied to the acoustic information from the microphone array—as it is known in the art.

The results of the separate, individual classification for a detected event in both of the acoustic audio and visual 3D information within the events region of interest, are then combined 42 to provide a classified detected event 41 in a combined analysis of the classification results in both information. The combining can therein e.g. be rule based and/or machine learned to derive logical combinations, consequences and/or relations of acoustic and visual 3D information of detected events within the same and/or different domains and with a logical relation in their according regions of interest. Thereby, a multimodal combined classification of the detected event can be provided.

Figure 3:
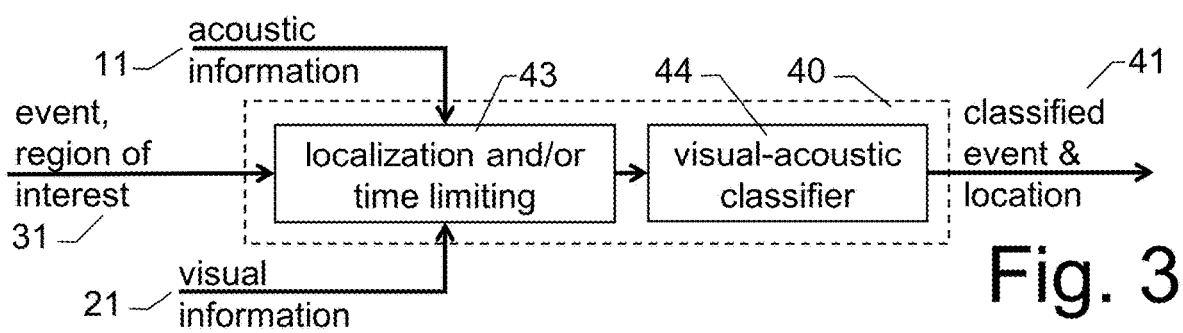
FIG. 3 shows an example of a sub block diagram of a second embodiment of the present invention.

FIG. 3 shows an illustration of an example of a second embodiment of a classifier 40 according to the present invention. Therein a conjoint classification in multiple domains, in particular in the acoustic information domain and in the visual 3D information domain, is applied by the multimodal classifier 44 that provides a classified detected event 41. Therein, the classifier 44 is also applied only to the region of interest of the detected event 31, e.g. by limiting the information provided to the classifier 44 to a localization and/or time of the region of interest—as indicated in block 43. Thereby, a multimodal combined classification of the detected event can be provided.

The first (FIG. 2) and the second (FIG. 3) example of an embodiment of the classifier can also be combined, e.g. evaluated in parallel, to form a third example of an embodiment.

Figure 4:
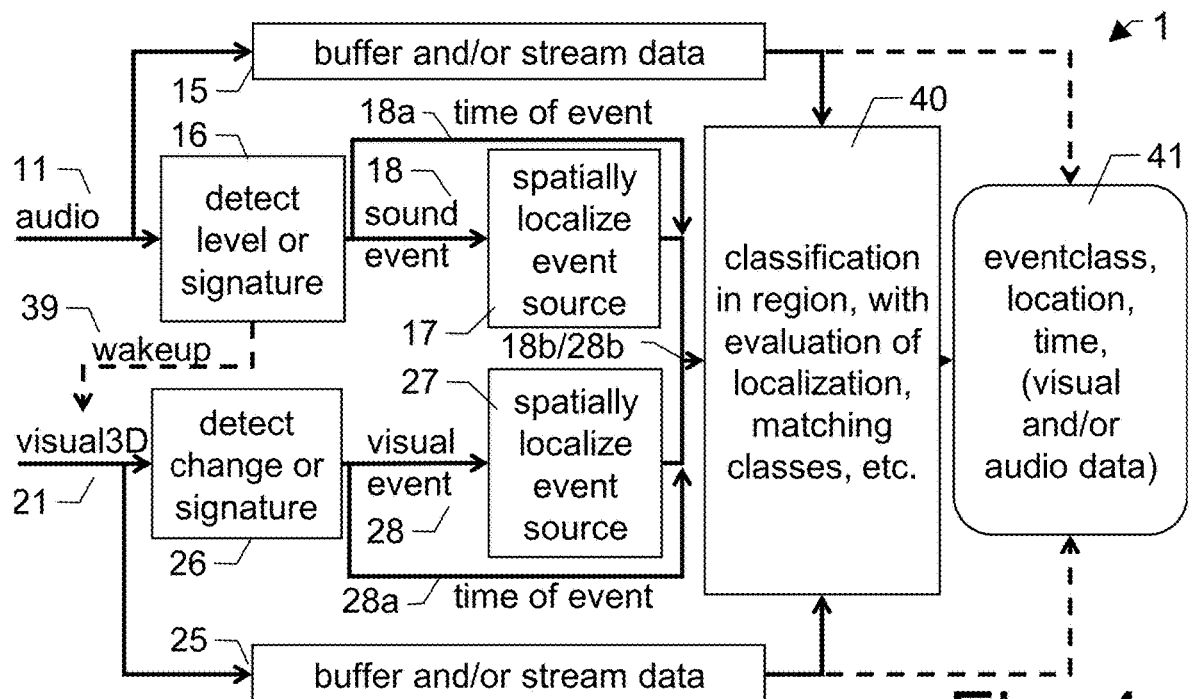
FIG. 4 shows an example of a second block diagram of an embodiment of the present invention.

FIG. 4 shows an example of an embodiment of the present invention, in which acoustic audio information 11—as one domain or channel—is continuously captured by a multi-channel microphone array. This audio information 11 is provided to a detector, which is configured to detect sound events 18, and to provide a detected event, e.g. to raise a notification. The detecting of an event 18 can e.g. comprise a detection of an increase or decrease of an acoustic sound level, in particular of a sudden increase or decrease, and/or a detecting of a certain signature in the audio information 11, e.g. a spectral configuration, a waveform pattern, a keyword or keysound, etc. or other, more advanced detection algorithms. The detected event 18 therein also comprises a time information 18a, of when the event 18 is detected, which can also be provided implicitly by the time the event is raised or explicitly in form of a timestamp. According to the invention, the detected sound event 18, respectively a source or origin of the sound event 18 is spatially localized in the audio information from the multiple microphones—as indicated in block 17, in particular at least in a directional information, preferably also in a distance information or in a 3D information in the monitored area. Thereby, the detected sound event 18 is complemented by its associated spatial region according to the localization 18b and its time region or interval according to the time information 18a, which is further referred to as region of interest of the detected event 18.

Similar is done in the other domain or channel, with respect to the visual 3D information 21, in which a visual detector 26 derives visual 3D events 28 in the visual 3D information 21. Such can for example comprise a detecting of spatial and/or optical changes in the visual 3D information 21 over time or other, more advanced detection algorithms. As above, a detected visual event 28 is also provided with a time information 28a of when the event is detected. Also, a localization 28b of the event in the monitored area is derived for the visual event 28, e.g. in form of a coordinate information within the monitored area. Thereby, the detected visual event 28 is complemented by its associated spatial region according to the localization 27 and its time region or interval according to the time information 28a, which is further referred to as region of interest of the detected event 28.

The detected events can therein comprise at least one or more of a sound event 18, a visual event 28 or both. Those detected events (regardless of their channel) with their regions of interest are provided to the classifier 40 which is activated upon such a detected event and configured to always analyze both, the audio information 11 and the visual 3D information 21, specifically within the region of interest of the event 18/28. The classifier is therefore provided with audio information 11 and the visual 3D information 21, which can be buffered for a certain time to also analyze pre-event conditions, resulting changes and/or compensate for processing time of the detection, localization, classification, etc. and/or which can optionally also be pre-processed, in particular with respect to the region of interest. The classification assigns one or more classes of a set of predefined classes, optionally with a confidence score for the class, to the detected event based on the acoustic and visual 3D information within the region of interest of the detected event. The classification thereby provides the detected event as a classified event 41 with information of time and spatial location within the monitoring area for further processing, e.g. raising an alarm condition at the monitored area, wherein optionally also the according acoustic 11 and visual 21 information of the region of interest of the classified detected event 41 is provided.

Figure 5:
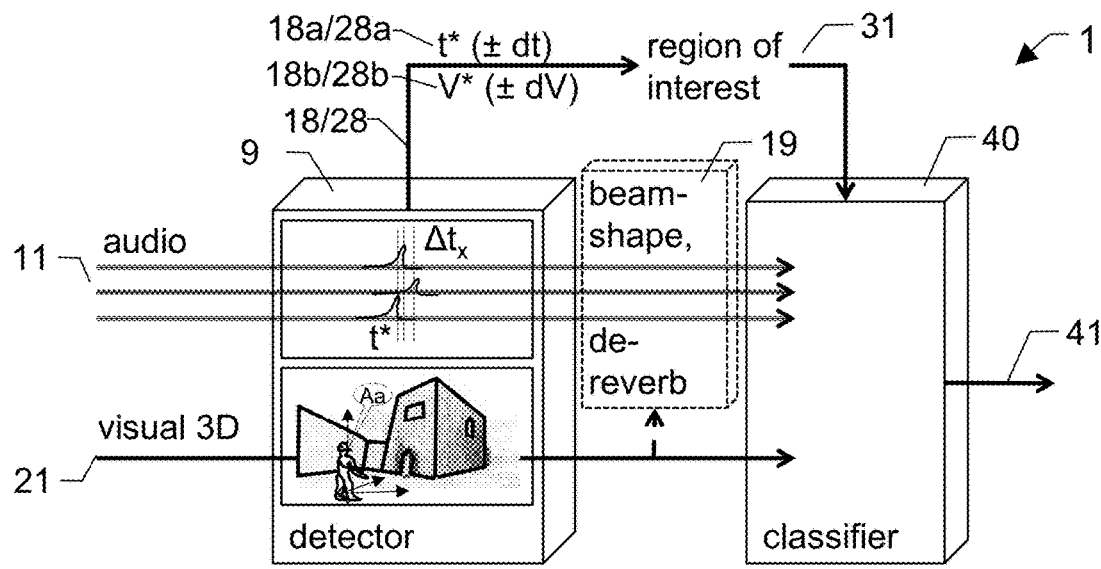
FIG. 5 shows an example of a third block diagram of an embodiment of the present invention.

FIG. 5 shows another example illustrating the present invention, in which multichannel audio 11 and visual 3D 21 information is provided as channels to a detector 9. The detector 9 detects events 18/28 in the channels and provides a region of interest 31 for the detected events, based on the information of the respective channels. Then a classifier receives the events 18/28 of at least one of the channels and applies a classification to the information of both of the channels within (or substantially about) the region of interest 31 of the detected events 18/28, in particular independent of whether the event is detected in the (upper-shown) acoustic channel or in the (lower-shown) visual channel or in both. The classifier then analyzes the audio and visual 3D information, 11/21, to derive a classification of the content of the region of interest in the information and to assign it to a class of known contents. In such a configuration according to the invention, the system provides a detected event with a combined classification of the detected event, with information of the localization and time of the detected event as monitoring result 41.

Optionally, the acoustic audio information can be pre-processed as indicated in block 19 to enhance the information for the classification, e.g. with a beam shaping of the acoustic direction to the region of interest, a de-reverberation, an echo cancellation, a background noise suppression, etc.—which can in an aspect of the invention also take into consideration at least part of the visual 3D information derived (preferably substantially in real time) in the visual channel—as indicated by the dashed arrow. In another embodiment, information on the 3D geometry of the monitoring area that is derived from the visual 3D information can also be provided to the localization in the acoustic channel, e.g. enhance the acoustic localization, rule out ambiguities, etc.

Figure 6:
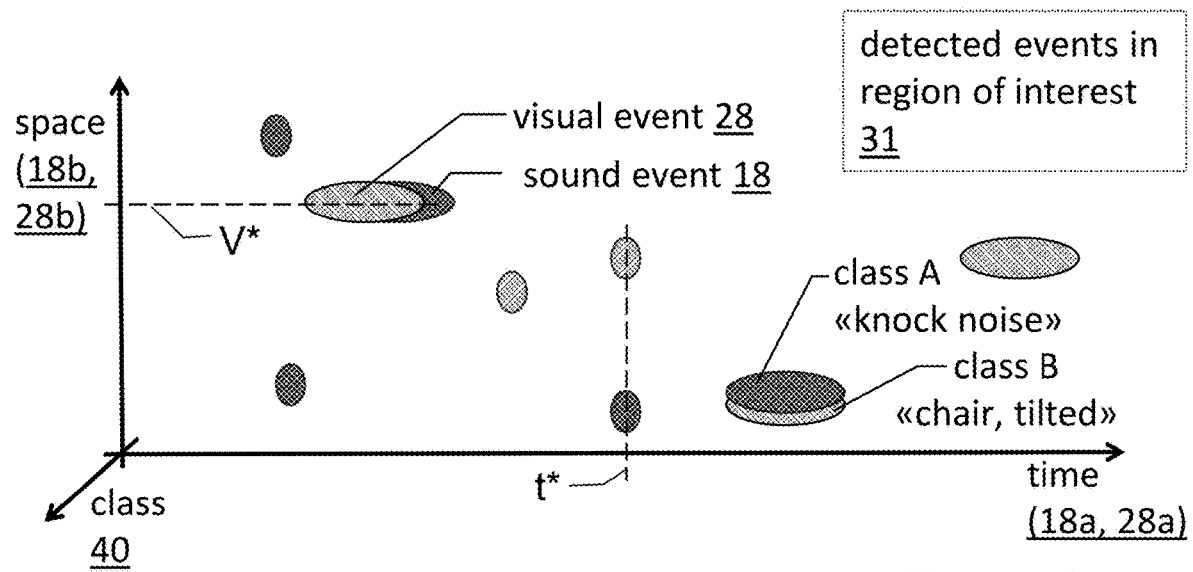
FIG. 6 shows an illustration of example of internal and external results of an embodiment according to the invention.

FIG. 6 illustrates a system according to the invention and its principles in an abstracted graphical view, in which the detected events 31 are shown in their region of interest in a time 18a/28a and space 18b/28b plain. Therein, space 18b/28b is preferably a three-dimensional space information, shown in this figure reduced to a one-dimensional vicinity information. The detected events are visual events 28 and/or sound events 18. According to the invention, the detected events are classified to classes, e.g. the shown class A or class B, which are shown in a third class axis 40. The events can, but need not to be, substantially equal in the region of interest, in time t* or space V* or both. As an example, there is a sound event detected at a region of interest, and a visual event in substantially a same region of interest. The classification of the acoustic information for this region of interest results in a class A of a "noise" as a "knock" whereas the visual information in this region of interest results in class B of a "chair" and a sub-classification of "tilted" optionally with "about 90°". The classification of the detected event can therefore be composed to a classified "fallen chair" event that has been detected in a combined view of the region of interest.

In another example, the present invention can detect a sound event at one region of interest A, in which no corresponding visual event had been detected. Yet a classifier is applied in the visual 3D information to analyze this one region of interest A, e.g. optionally after a wake up of the visual capturing unit due to the sound event. The acoustic information classifies to a "ringing" and the visual information classifies to a "communication unit", whereby a combined classification for the detected event can be computed to a "cellphone ringing" at the spatial location according to the one region of interest A.

Another example, where only a visual event, but no sound event is detected can be drafted vice-versa. Also, examples when e.g. the spatial region of contemporaneous events do not match, but there is a coincidence or interdependence in their respective classification, like a shot and a man falling, etc.

Figure 7:
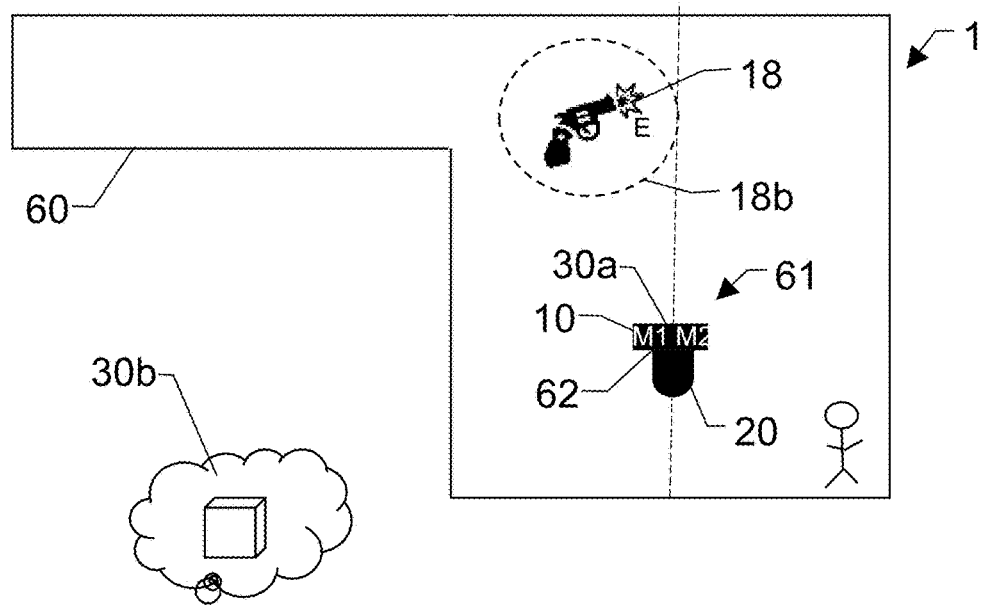
FIG. 7 shows an example of a monitoring site with an embodiment of a system according to the invention.

FIG. 7 shows an example of a monitoring area in form of a room 60, in which a monitoring system 1 according to the invention is provided. The room 60 is thereby equipped with a monitoring or surveillance device 61 according to the invention. The device 61 comprises at least a 3D visual capturing unit 20, e.g. a laser scanner, rim camera or structured light sensor under the dome shape, a microphone array 10 with a plurality of microphones (M1, M2, . . . ) substantially surrounding the dome with the 3D visual capturing unit 20 and a computation unit 30a configured for carrying out at least a portion of the method according to the present invention, preferably all of the method or at least establishing a data link to a remote computation unit 30b that is configured to carry out a locally missing portion of the method according to the present invention. Optionally, also the anomaly identification unit 62 can be at least partially be comprised in the device 61.

In the example, the acoustic channel of the detector detects a short loud noise that raises a sound event 18 and the detector also localizes the origin of sound event 18 in the monitoring area to a spatial region of interest 18b. At the same time, the visual event detector registered no event. According to the invention, the sound event nevertheless configures a visual classification of (or about) the region of interest 18b, in particular at (or about) the time of the sound event 18. The acoustic information at (or about) the time of the sound event 18 is then classified in the acoustic domain to be in the class of a "bang" (which is not highly meaningful on its own). The classification in the visual domain—although no event had been detected in this domain—classifies the region of interest to comprise an object in the class of a "gun". The combined classification for the event can thereof be automatically derived to be in a class of "shooting incident", from a known location and time, comprising visual 3D information of the perpetrator.

When the visual detector shortly afterwards detects a visual event in another location at the monitoring area, which correlated with no sound event, but classifies to a "human" and "sinking to ground", the detected event can be automatically further classified to a "harmful shooting incident", also revealing the victim and the location which can automatically be used to dispatch police and ambulance by the computation system.

In such an example with a half-dome shaped visual 3D capturing unit that is surrounded by a microphone array, the problem can arise that in most constellations at least one of the microphones is out of direct "line of sight" with the audio source, as it is occluded by the visual 3D capturing unit. Such an occlusion can have negative effects to the localization of the source of the sound as indirect, reflected sounds can result in an incorrect timing. In an aspect according to the present invention such can be overcome by deriving an at least rough 3D geometry of the monitoring area from the geometric 3D information that is derived by the visual 3D capturing unit. For example, at least substantially large, flat surfaces of the monitoring area can be derived and modeled. This 3D geometry is provided to the acoustic localization unit, which is configured to derive its influence to the acoustic information on the localization, like indirect sound paths, echoes, reverberation, boundaries of possible localization, etc.

Optionally, this 3D geometry can be updated substantially in real time in a system according to the invention, e.g. to correct for a crowded or deserted platform at a railway station, presence or absence of a train, etc. and its influence on acoustic signal propagation. According to this aspect, such a 3D geometry is included in the acoustic localization to correct its effects by considering at least the most dominant indirect acoustic signal paths and/or in an enhancement and/or beam shaping of the acoustic information that is provided to the classifier by correcting the audio information content. For example, acoustic reflections, an acoustic impulse response, etc. of the monitoring area can be calculated in. Theoretical algorithms as part of a numerical implementation on a computation system according to the invention are known in the art.

The assigning of a detected event to a class within a plurality of event classes by the classifier comprises an analyzing of the geometric 3D information, which is done specifically within the region of interest of the detected event (which event is not necessarily detected in the geometric 3D information but can also or only be detected in the acoustic information). For example, such can comprise applying of a classification algorithm executed by the computation unit for each detected event, preferably within a limited segment or bounding box within the geometric 3D information of the monitoring area that is defined at or around the spatial region of interest of the detected and localized event and/or at a time or in a time-interval around a time region of interest of the detected event in the geometric 3D information.

The assigning of a detected event to a class within a plurality of event classes by the classifier also comprises an analyzing of the acoustic information, which is done specifically within the region of interest of the detected event (which event is not necessarily detected in the acoustic information but can also or only be detected in the geometric 3D information). For example, such can comprise applying of a classification algorithm executed by the computation unit for each detected event, preferably at a time or in a time-interval around a time region of interest of the detected event and optionally also within a limited spatial region of interest of the detected and localized event, e.g. with numerically applying acoustic beamforming to the acoustic information from the microphone array.

In an embodiment, the classification algorithm for assigning the class can e.g. comprise a 3D object classification algorithm that evaluates the geometric 3D information in a supervised or semi-supervised machine learned pattern recognition algorithm (e.g. with a prediction based on feature vectors) on the data from the visual 3D capturing unit that can e.g. comprise 3D point cloud data and also other visual information like infrared and/or visual RGB image information. The classification algorithm for assigning the class then also comprises an acoustic audio classification algorithm that evaluates the acoustic information in a supervised or semi-supervised machine learned pattern recognition algorithm (e.g. with a prediction based on feature vectors) on the data from the acoustic capturing unit that can e.g. comprise pre-processed or raw audio data from the microphone array in time domain, frequency domain or in advanced approaches such as e.g. MFCC (Mel-Frequency Cepstral Coefficients) or the like.

Besides or in addition to such a separated classification of the detected events region of interest in the geometric 3D information and acoustic information, which classification results are then merged to form a classification of the detected event, another embodiment can also comprise a multi-modal classifier that is applied to a combination of geometric 3D and acoustic information to derive a classification of the detected event.

For example, linear classifiers, quadratic classifiers, Support Vector Machines (SVM), Kernel estimation, decision trees, neural networks, learning vector quantization and/or boosting meta-algorithms can be utilized for the classifications described herein.

Figure 8:
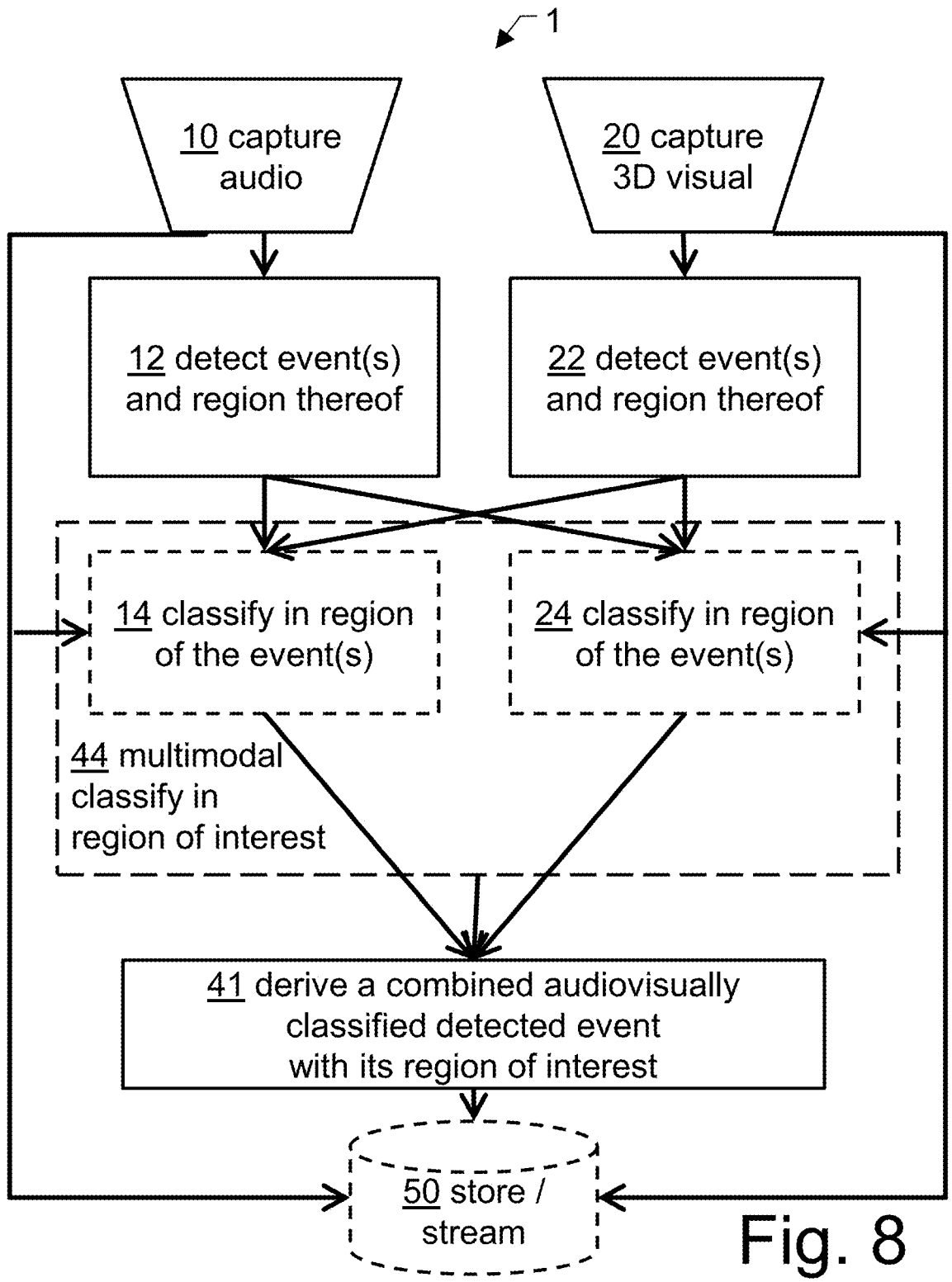
FIG. 8 shows an example of a flow diagram of an embodiment according to the invention.

An example of an embodiment of a method of monitoring an area according to the present invention is shown in FIG. 8 in a flow diagram. For example, such a workflow can comprise at least:

A capturing of a multi channels acoustic audio information in a monitoring area, for example by a microphone array—as symbolized in box 10.

A capturing of a visual 3D information of the monitoring area, for example by an opto-electronic 3D capturing unit such as a laser scanner or rim camera—as symbolized in box 20.

A detecting of one or more events in the acoustic audio information with a determining of a corresponding region of interest for the detected events based on the acoustic audio information, which region of interest comprises at least a localization of a source of the event in the monitoring area and a time of the event—as symbolized in box 12.

A detecting of one or more events in the visual 3D information with a determining of a corresponding region of interest for the detected events based on the visual 3D information, which region of interest comprises at least a localization of the event in the monitoring area and a time of the event—as symbolized in box 22.

A classifying of the acoustic audio information for the detected event from either of the detectings 12 or 22, within the region of interest of this detected event—as symbolized in box 14.

A classifying of the visual 3D information for the detected event from either of the detectings 12 or 22, within the region of interest of this detected event—as symbolized in box 24.

In another embodiment, the classifying of the detected event can additionally or alternatively also be embodied with a conjoint classification of the visual 3D information and the acoustic audio information in a combined multimodal classifier within the region of interest of this detected event—as symbolized in the optional broken-line box 44.

A deriving of a combined audio-visually classified detected event with its region of interest—as symbolized in box 41.

Optionally, there can be a local and/or remote storage or another data-stream sink for the visual 3D information and the acoustic audio information and for the detected event with its region of interest and its classification from the classifier—as symbolized in box 50.

Figure 9:
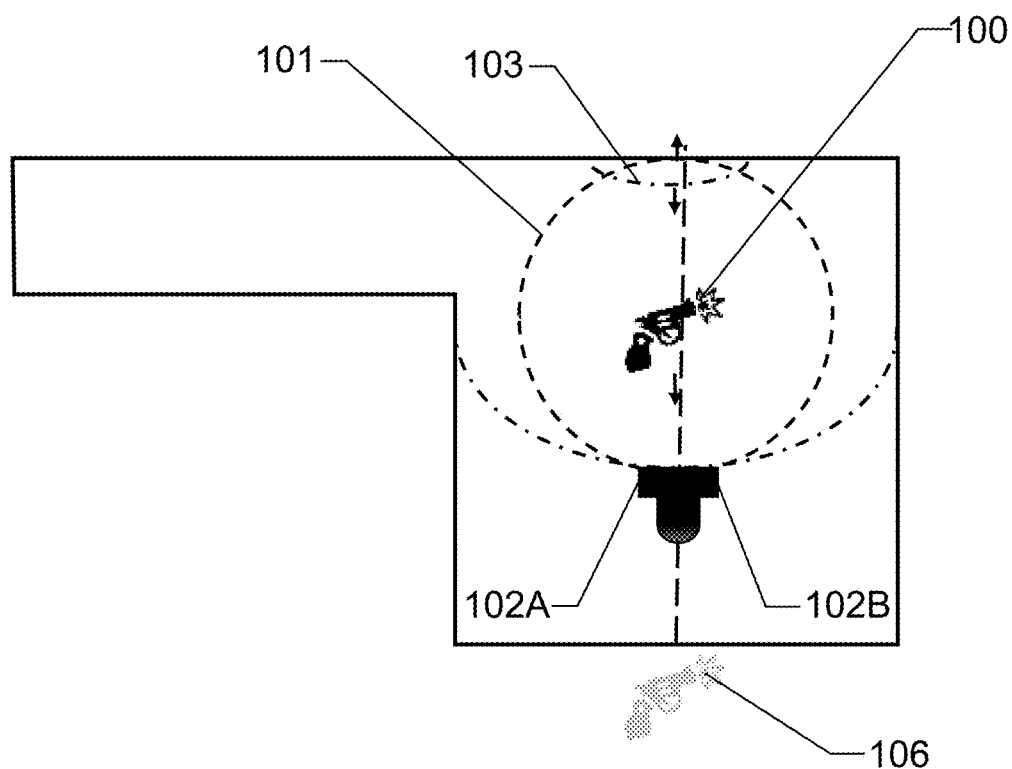
FIG. 9 shows an exemplary configuration wherein interpretation of secondary sound signals allows to resolve an ambiguity in the localization of the sound event.

FIG. 9 shows an exemplary configuration wherein interpretation of secondary sound signals allows to resolve an ambiguity in the localization of the sound event 100. By way of example, the sound event 100 is a gun shot, wherein a sound signal 101 propagates concentrically through the air medium and is then recorded by at least two microphones 102A, 102B without being reflected within the environment. This is identified by each of the two microphones 102A, 102B as primary sound signal. The wave front is further reflected (echoed) by the enclosing walls or obstacles in the room. Direct reflections result in a clear echo signal 103 that is also recorded by the microphones 102A, 102B and, for example, is used as secondary sound signals. Multi-reflections, reflections at flat angles, resonance effects and others lead also to a broadening of the recorded signal width instead of a clearly separated signal. Anyway, also multi-reflections are detectable and may be analyzed for the determination of the localization of the sound event.

Figure 10:
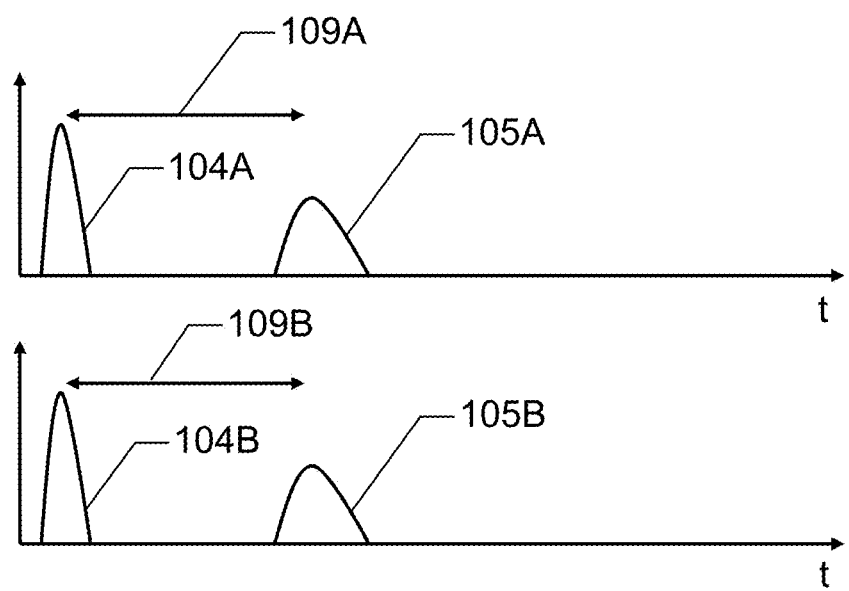
FIG. 10 exemplarily shows primary and secondary return signals of the two microphones of the configuration depicted by FIG. 9.

Here, a symmetric case is illustrated, wherein, as a function of time t, corresponding primary signals 104A, 104B recorded by the two microphones 102A, 102B and corresponding secondary signals 105A, 105B are depicted by FIG. 10.

Without knowledge of the geometry of reflective walls around the microphone array it would be impossible to distinguish between the sound event 100 and a so-called mirror event 106. However, the actual knowledge of the surrounding geometry, e.g. provided by the visual 3D capturing unit, allows for interpreting the signal differences and for a better geometrical location of the sound event 100.

By way of example, the event detector comprises an acoustic localization algorithm configured to determine the localization of the sound event 100 by determining differences 109A, 109B in arrival times of the primary signals 104A, 104B and their corresponding secondary signals 105A, 105B. These differences 109A, 109B of arrival times are interpreted in light of the 3D model of the environment and, based thereof, the mirror event 106 is discarded. In other words, the actual knowledge of the surrounding geometry allows the acoustic localization algorithm to interpret differences in the times of arrival of the primary and secondary sound signals for resolving ambiguities in case only primary sound signals would be analyzed.

Using more than two microphones provides another or an additional possibility to identify false events such as the mirror event 106 described above. By way of example (not shown), in one embodiment, the monitoring system features at least three acoustic microphones. When analyzing three or more acoustic signals, run-time differences in the primary acoustic signals can be detected for nearly all locations of sound events. For example, referring to FIG. 9, a third microphone located closer to or further away to the location of the sound event 100 would deliver an acoustic signal that features a significant run-time difference to the other (symmetric) acoustic signals. However, even configurations with three or more microphones can fail to locate acoustic events with sufficiently high confidence. This is the case in scenarios when the primary sound signal is blocked, i.e. the direct sound propagation from the event to the microphones is blocked through walls, or even temporal barriers such as moving objects, e.g. vehicles.

Figure 11:
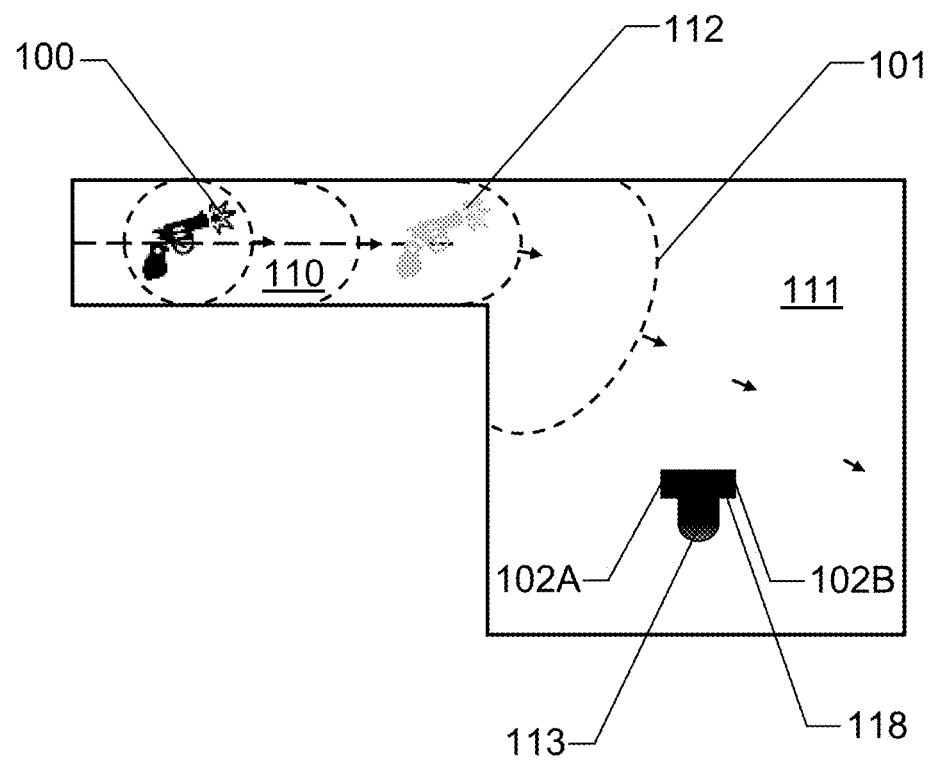
FIG. 11 exemplarily shows a further configuration wherein interpretation of secondary sound signals allows for improved localization of the sound event.

FIG. 11 exemplarily shows a further configuration wherein interpretation of secondary sound signals allows for improved localization of a sound event.

In the example shown, the sound event 100 is a gun shot fired in a narrow corridor 110 inside a building, wherein the acoustic capturing unit, having two microphones 102A, 102B, is located in a room 111 adjacent to the corridor 110. The sound signal 101 propagates concentrically through the air medium, wherein there is no direct line-of-sight between the sound event 100 and the microphones 102A, 102B. By only analyzing arrival times of the respective primary sound signals 104A, 104B (FIG. 12) it appears to the acoustic capturing unit that the sound event is located near an entrance point 112 of the room 111, where direct line-of-sight to the two microphones 102A, 102B is given.

On the way to the acoustic capturing unit the wavefront is further reflected (echoed) by the enclosing walls of the corridor 110, the walls of the room 111, or obstacles in the way. Certain reflections can be associated to certain impacts on the amplitude or shape of a reflected sound signal. For example, direct reflections result in a clear echo signal, e.g. which essentially maintains the "pre-impact" shape but has reduced amplitude, whereas multi-reflections, reflections at flat angles, and resonance effects lead to a distortion of the signal shape, e.g. a broadening of the recorded signal width.

In this exemplary embodiment, the visual 3D capturing unit 113 is configured as a laser scanner with at least a half-dome scanning range for deriving a point cloud of the room 111. Further 3D information on the geometry of the corridor 110 may be provided to the monitoring system by a further visual 3D capturing unit (not shown) or a predefined 2D or 3D building model, e.g. footprint data for the building, provided to the monitoring system. Using both the point cloud of the room 111 and the further information on the corridor 110 the monitoring system is configured to derive a 3D model of the environment (e.g. at least comprising the corridor 110 and the room 111).

Figure 12:
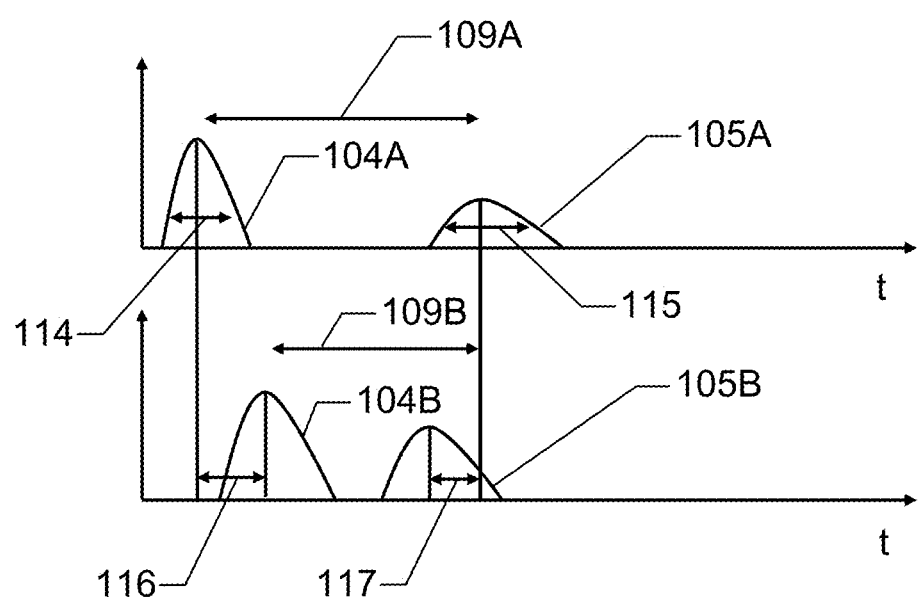
FIG. 12 exemplarily shows primary and secondary return signals of the two microphones of the configuration depicted by FIG. 11.

As depicted by FIG. 12, showing primary and secondary return signals of the two microphones of the configuration depicted by FIG. 11, the acoustic localization algorithm is further configured to determine signal widths 114, 115 of the primary and secondary sound signals, as well as differences 116, 117 between arrival times of the primary sound signals 104A, 104B and between arrival times of the secondary sound signals 105A, 105B, respectively. The acoustic localization algorithm then interprets these parameters in light of the 3D model of the environment and is thus able to determine the correct localization of the sound event 100.

Localization of the sound event 100 may further be improved by taking into account different acoustical properties of the surfaces of the walls of the corridor 110 and the room 111. For example, the monitoring system comprises a camera 118 for acquiring images of the environment and is configured to analyze laser data of the laser scanner 113 in order to classify the walls of the corridor 110 and the room 111. By way of example, color and intensity information may be used for determining surface roughness, which may be used to estimate the material of the walls. This allows to derive a damping ratio and signal distortions between incoming and reflected acoustic wave as a function of an incident angle of the sound wave onto the respective surface.

Alternatively or in addition, acoustical properties of walls and other objects may be drawn from acoustic information captured by the microphones themselves. For example, in the presence of a so-called "standard sound source", which essentially generates a well-defined sound signal, this well-defined sound signal can be interpreted in view of a known trajectory of the well-defined sound signal, e.g. in case at least a rough location of the standard sound source is known or derived, e.g. by visual identification using semantic image classification.

By way of example, the standard sound source may generate a constant noise or a repetitive noise, e.g. a pattern of different sounds such as a repeating pattern of pitches and volume levels. Examples of such standard sound sources are a ringing telephone, a vehicle with a siren, or an engine running at constant speed.

For example, by measuring different echoes of the well-defined sound, i.e. recording sound signals corresponding to different trajectories between the standard sound source and the microphone, a damping ratio and signal distortions between incoming and reflected acoustic wave as a function of an incident angle of the sound wave onto surfaces of respective trajectories can be derived. This allows to derive a model of acoustic properties of the walls, e.g. comprising damping strengths and signal distortions for a variety of incidence angles.

A skilled person is aware of the fact that details, which are here shown and explained with respect to different embodiments, can also be combined with details from other embodiments and in other permutations in the sense of the invention.

What is claimed is:

1. A monitoring system for locating and classifying an event in a monitoring area by a computation system, the monitoring system comprising:
   a visual three-dimensional (3D) capturing unit, configured to capture and provide a geometric 3D information of the monitoring area;
   an acoustic capturing unit with a microphone array and configured to derive and provide an acoustic information of the monitoring area;
   an event detector comprising an acoustic channel and a visual channel to detect the event and to determine a localization of the event, wherein
      the acoustic channel is provided with the acoustic information and is configured to detect the event as a sound event in the acoustic information and to determine a localization of the sound event in the monitoring area based on the acoustic information, or
      the visual channel is provided with the geometric 3D information and is configured to detect the event as a visual event in the geometric 3D information and to derive a localization of the visual event in the monitoring area based on the geometric 3D information,
   wherein the event detector is configured to provide detected events with a region of interest, comprising the localization and a time information of the detected event; and
   a classifier provided with the geometric 3D information, the acoustic information, and the region of interest, and configured to analyze the region of interest by processing the acoustic information and geometric 3D information within the region of interest in order to assign the detected event a class within a plurality of event classes,
   wherein the localization of the sound event is derived with a correcting of an influence of at least part of a 3D geometry of the monitoring area that is derived from the geometric 3D information to the acoustic information, with a computing of a corrected spatial localization of the sound event comprising a reverberation or echo.

2. The monitoring system according to claim 1, wherein the classifier is configured to classify both, the acoustic information within the region of interest as well as the visual information within the region of interest individually.

3. The monitoring system according to claim 1, wherein the classifier is configured to conjointly classify the acoustic information and the geometric 3D information within the region of interest in a multimodal classifier.

4. The monitoring system according to claim 1, wherein upon the event being detected, the classifier is configured to analyze the acoustic information with an applying of a numerical acoustic beamforming towards the localization of the detected event and within a limited time-interval around the detected event.

5. The monitoring system according to claim 1, wherein the visual 3D capturing unit is configured with a laser range finder with a pivotable measurement direction, and is configured to derive a point cloud of the monitoring area.

6. The monitoring system according to claim 1, wherein the localization of the sound event is derived with an acoustic localization in at least a direction, by an evaluation of the acoustic information of the sound event.

7. The monitoring system according to claim 1, wherein the acoustic information is provided to the classifier with a correcting of an influence of at least part of a 3D geometry of the monitoring area to acoustic information, which 3D geometry is derived from the geometric 3D information.

8. The monitoring system according to claim 1, wherein the classifier is embodied with an at least semi-supervised deep learning algorithm trained on a set of training data which is at least partially artificially generated based on digital models.

9. The monitoring system according to claim 1, wherein the region of interest is derived with a direction information from the localization of the sound event combined with a corresponding distance measurement in this direction from the geometric 3D information.

10. The monitoring system according to claim 1, wherein:
   the visual 3D capturing unit has a standby mode and an alert mode, wherein in the standby mode a rate of capturing the geometric 3D information is lower than in the alert mode, and
   in the acoustic channel, the acoustic information is continuously provided to the event detector to detect sound events, and upon a detection of the sound event, the visual 3D capturing unit is set into the alert mode.

11. The monitoring system according to claim 1, wherein upon the event being detected, the classifier is configured to analyze visual information in a limited spatial bounding box within the monitoring area according to the localization of the detected event and to a limited time-interval around the detected event.

12. A monitoring method for detecting, locating, and classifying an event in a monitoring area by a computation system, the method comprising:
   generating of data providing a geometric 3D information of the monitoring area;
   deriving of an acoustic information of the monitoring area;
   providing of the acoustic information to an acoustic channel of an event detector, for a detecting of a sound event in the acoustic information and determining a localization of the sound event in the monitoring area based on the acoustic information by an acoustic localization algorithm;
   providing the visual information to a visual channel of the event detector, for detecting of a visual event in the geometric 3D information and deriving of a localization of the visual event in the monitoring area based on the geometric 3D information according to 3D coordinates of the visual event; and
   detecting the event and determining the localization of the event in at least one of the acoustic or visual channel of the event detector, with a deriving of at least one region of interest for the detected event comprising the localization and a time of the detected event;
   analyzing the region of interest within the monitoring area by a classifier analyzing of acoustic information and of geometric 3D information associated to the region of interest; and
   assigning the detected event to a class within a plurality of event classes, wherein the assigning of the class is taking into account acoustic and visual classification features within the region of interest,
   wherein the localization of the sound event is derived with a correcting of an influence of at least part of a 3D geometry of the monitoring area that is derived from the geometric 3D information to the acoustic information, with a computing of a corrected spatial localization of the sound event comprising a reverberation or echo.

13. A computer program product with program code being stored on a tangible, non-transitory machine readable medium, the program code being configured for the execution of the method of claim 12.

14. A building or facility surveillance device configured to detect an anomaly at a surveillance-site and to provide a localization and classification of the anomaly, the device being installed stationarily at a surveillance-site to establish a monitoring system, the device comprising:
- a visual 3D capturing unit comprising a laser range finder, configured to provide geometric 3D data of at least a portion of the surveillance-site;
- at least two acoustical-electrical transducers arranged in a microphone array spatially separated with a defined distance and/or with a different orientation of their spatial directivity, the at least two acoustical-electrical transducers being configured to translate acoustic signals or sound waves into audio signals which are digitized to at least two according digital audio signals;
- a local computational unit or a data link to an at least partially externally computation unit, which computation unit is configured to comprise an event detector, with a visual channel and an acoustic channel, and a classifier configured to be activated upon an event from the event detector and configured to be applied to a region of interest of an event detected according to the method of claim 12; and
- an anomaly identification unit configured to identify one or more of the detected and classified events to a type of anomaly or to a security alert, which security alert comprises the classification and region of interest of the detected event.

* * * * *